US008616106B2

(12) United States Patent
Hayashi et al.

(10) Patent No.: US 8,616,106 B2
(45) Date of Patent: Dec. 31, 2013

(54) SHEET CUTTING APPARATUS AND IMAGE FORMING APPARATUS

(75) Inventors: Kenichi Hayashi, Abiko (JP); Kiyoshi Watanabe, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 829 days.

(21) Appl. No.: 12/034,187

(22) Filed: Feb. 20, 2008

(65) Prior Publication Data

US 2008/0202302 A1 Aug. 28, 2008

(30) Foreign Application Priority Data

Feb. 27, 2007 (JP) ................................. 2007-046860
Feb. 8, 2008 (JP) ................................. 2008-028621

(51) Int. Cl.
*B26D 1/00* (2006.01)
*B23D 35/00* (2006.01)

(52) U.S. Cl.
USPC .......................................... 83/651; 83/699.11

(58) Field of Classification Search
USPC ......... 83/267, 363, 107, 81, 699.11, 651, 102
See application file for complete search history.

(56) References Cited

U.S. PATENT DOCUMENTS 1,058,964 A * 4/1913 Gray ............................... 83/388
2,539,602 A * 1/1951 Wehr .............................. 83/694
2,939,358 A * 6/1960 Pearson .......................... 83/641
2,973,678 A * 3/1961 Scott et al. ........................ 83/96
3,552,246 A * 1/1971 Bryson et al. ...................... 83/23
4,207,667 A * 6/1980 D'Angelo et al. .............. 29/417
4,213,385 A * 7/1980 Dahlem .......................... 100/95
4,246,816 A * 1/1981 Ivanoff ........................... 83/157
4,445,409 A * 5/1984 Mohr et al. ..................... 83/157
4,624,164 A * 11/1986 Passa ............................. 83/542
4,742,742 A * 5/1988 Yokoe ............................ 83/101
5,214,992 A * 6/1993 Mohr ............................. 83/268
5,377,569 A * 1/1995 Richards et al. .................. 83/98
5,379,668 A * 1/1995 Standing ........................... 83/99
5,569,146 A * 10/1996 Simmons ...................... 493/352
6,035,752 A * 3/2000 Harhay et al. .................. 83/111
6,145,561 A * 11/2000 Watanabe et al. ............. 156/517
6,532,856 B2 * 3/2003 Kato et al. ...................... 83/934
6,536,319 B1 * 3/2003 Boss .............................. 83/247
6,601,490 B1 * 8/2003 Gross et al. ........................ 83/27
6,796,209 B2 * 9/2004 Boss .............................. 83/365
(Continued)

FOREIGN PATENT DOCUMENTS

JP 62-134698 8/1987
JP 08-192388 A 7/1996
(Continued)

*Primary Examiner* — Ghassem Alie
*Assistant Examiner* — Bharat C Patel
(74) *Attorney, Agent, or Firm* — Fitzpatrick, Cella, Harper & Scinto

(57) ABSTRACT

A sheet cutting apparatus having a movable blade which lowers toward a sheet from above to cut the sheet; and a pushing member which lowers together with the movable blade to push a cut piece of the sheet cut by the movable blade. The pushing member has a plurality of pushing surfaces which are arranged along the tip of the movable blade at a distance from each other, and the plurality of pushing surfaces are in contact with the movable blade and are located upstream from a tip of the movable blade in a moving direction of the movable blade cutting the sheet.

13 Claims, 15 Drawing Sheets

(56) References Cited

U.S. PATENT DOCUMENTS

| | | | | |
|---|---|---|---|---|
| 6,889,585 | B1 * | 5/2005 | Harris et al. | 83/62 |
| 2004/0096253 | A1 * | 5/2004 | Ueno et al. | 399/385 |
| 2006/0266188 | A1 * | 11/2006 | Kim | 83/511 |
| 2007/0227323 | A1 * | 10/2007 | Meyer | 83/24 |

FOREIGN PATENT DOCUMENTS

| | | | |
|---|---|---|---|
| JP | 09-262789 | A | 10/1997 |
| JP | 2000-198613 | | 7/2000 |
| JP | 2005-271175 | | 10/2005 |
| KR | 599511 | B1 * | 7/2006 |

* cited by examiner

SHEET CUTTING APPARATUS AND IMAGE FORMING APPARATUS

BACKGROUND OF THE INVENTION

1. Field of the Invention

The present invention relates to a sheet cutting apparatus which cuts a portion of a sheet, and more particularly, to a sheet cutting apparatus which cuts a portion of a bundle of a plurality of coupled sheets.

2. Description of the Related Art

Conventionally, a sheet cutting apparatus which cuts one ends of a sheet bundle in which central portions of a plurality of sheets are bound and they are folded into two at the coupling position to enhance the outward appearance is widely known as disclosed in Japanese Patent Application Laid-open No. 2000-198613.

The conventional sheet cutting apparatus conveys a sheet bundle whose central portions are bound is conveyed to between an upper cutting blade and a lower cutting blade, the upper cutting blade is lowered to the lower cutting blade, and cuts one ends of the sheet bundle located therebetween. Cut pieces generated by cutting the sheet bundle fall due to their own weights and are accommodated in an accommodating box located below the cut piece.

A rocking guide which guides the sheet bundle onto the lower cutting blade is provided above the accommodation box. The rocking guide guides the sheets to the lower blade when the sheet bundle passes, but when cutting, the rocking guide rocks and lowers and retreats so as not to hinder the falling motion of the cut pieces into the accommodation box. When the cutting is completed, the rocking guide again rocks and moves upward and guides the next sheet bundle.

The sheet bundle which is cut as described above is then conveyed to a batch accommodating portion (not illustrated) and accommodated therein.

In the conventional sheet cutting apparatus, a cut piece falls into the accommodation box by its own weight, but when the cut piece receives external resistance such as static electricity, air resistance and sliding resistance, the cut piece can not fall into the accommodation box in some cases. If the cut piece can not fall while the rocking guide is lowering (retreating), the rocking guide again moves upward and a path to the accommodation box is cut off. Therefore, even if the cut piece falls thereafter, the cut piece remains on the rocking guide. Such a phenomenon is prone to occur when the cut piece is light in weight or when the width of the cut piece (in the sheet conveying direction) is set short.

If a new sheet bundle is conveyed in a state where a cut piece remains on a convey path of a sheet bundle, the cut piece is conveyed together with the sheet bundle and is accommodated in the batch accommodating portion. If a cut piece is placed in the batch accommodating portion in which only bindings should be accommodated, this degrades dignity.

If a cut piece moves on the convey path, there is a deficiency that a sensor in the convey path erroneously detects.

To reliably accommodate a cut piece in the accommodating box, it is contemplated that another means such as air injection is newly provided, but this makes the structure complicated, the apparatus is increased in size and costs.

It is an object of the present invention to provide a sheet cutting apparatus having a simple structure and capable of avoiding a case in which a cut piece of a sheet does not fall and remains on a convey path.

SUMMARY OF THE INVENTION

To achieve the above object, a sheet cutting apparatus comprises:

a movable blade which moves downward to cut the sheet; and a pushing member located on a position retracted from a tip end of the movable blade, and having a pushing surface which moves together with the movable blade to push down a cut piece of the sheet cut by the movable blade.

According to the present invention, the pushing surface of the pushing member which moves together with the movable blade forcibly pushes down the cut piece of the sheet. Therefore, the cut piece of the sheet does not remain on the convey path and the cut piece reliably falls.

Since the pushing surface of the pushing member moves in association with the movable blade, it is unnecessary to newly provide a driving mechanism, and the sheet cutting apparatus can be realized with a simple structure.

Since a cut piece of a sheet can reliably fall without remaining on the convey path, the cut piece is not accommodated together with the sheet and thus dignity is not degraded, erroneous detection of a sensor in the convey path can be prevented and reliable motion can be realized.

Further features of the present invention will become apparent from the following description of exemplary embodiments (with reference to the attached drawings).

DESCRIPTION OF THE EMBODIMENTS

Preferred embodiments of the present invention will be described in detail with reference to the drawings. Sizes, materials, shapes and relative disposition of constituent parts described in the embodiments can appropriately be changed in accordance with a structure of an apparatus to which the invention is applied and in accordance with various conditions. Therefore, the invention is not limited to the described sizes, materials, shapes and relative disposition of constituent parts unless otherwise specified.

First Embodiment

Figure 1:
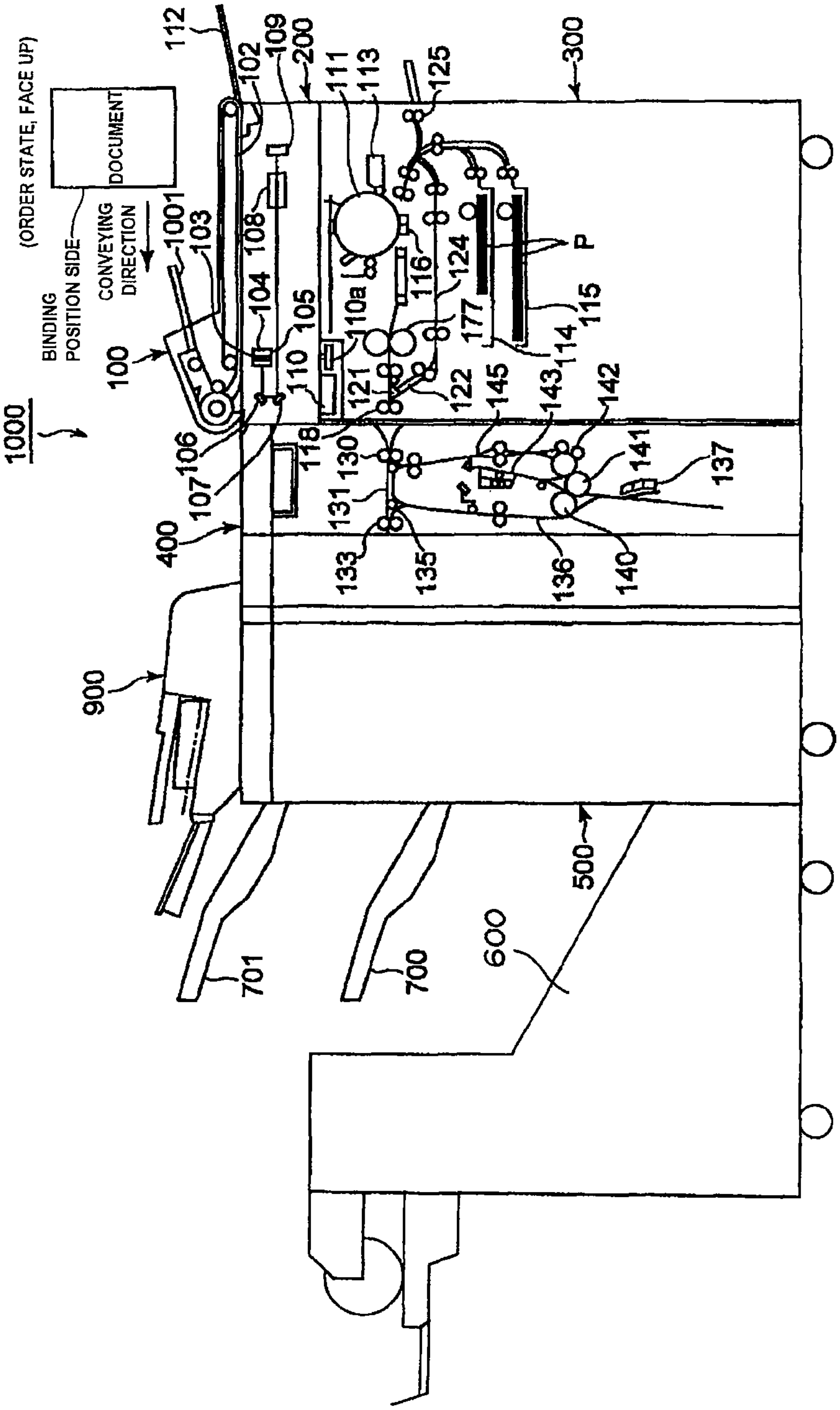
FIG. 1 is a sectional view illustrating one example of an outline structure of an image forming apparatus having a sheet cutting apparatus.
Figure 2:
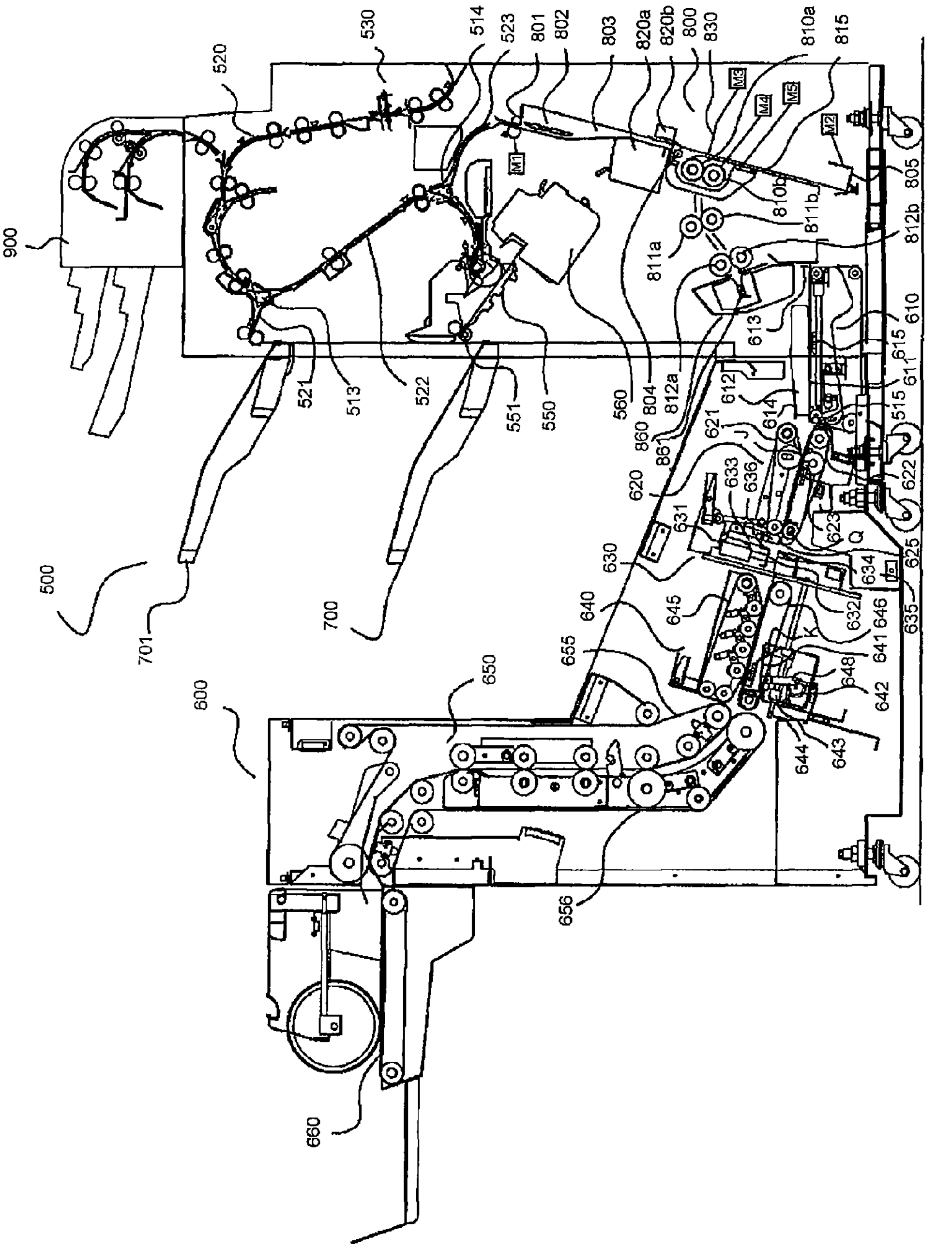
FIG. 2 is a sectional view illustrating one example of an interior structure of the sheet cutting apparatus.

A schematic structure of an image forming apparatus having a sheet cutting apparatus will be described using FIGS. 1 and 2. FIG. 1 is a sectional view illustrating one example of an internal structure of the image forming apparatus. FIG. 2 is a sectional view illustrating one example of the internal structure of the sheet cutting apparatus. Here, a copying machine is described as an example of the image forming apparatus.

(Structure of the Entire Image Forming Apparatus)

As illustrated in FIGS. 1 and 2, a copying machine 1000 has a document supply portion 100, an image reader portion 200, a printer portion 300, a folding processing portion 400, a finisher 500, a trimmer unit 600, a saddle stitch binding portion 800 and an inserter 900. The folding processing portion 400, the saddle stitch binding portion 800 and the inserter 900 are optionally provided. The copying machine 1000 will be described concretely below.

Documents are set on a tray 1001 of the document supply portion 100 in an upright state as viewed from a user and in a face up state (in a state where a surface formed with an image is directed upward). A binding position of the document is on a left end of the document. The documents set on the tray 1001 are conveyed one sheet by one sheet in the left direction (direction illustrated with the arrow in the drawing) from top page by the document supply portion 100, i.e., the binding position is directed forward. The documents are conveyed from left direction to the right direction on a platen glass 102 through a curved path and then, the documents are discharged onto a discharge tray 112. At that time, the scanner unit 104 is held at a predetermined position, and if the document passes above the scanner unit 104 from left to right, the document is read. This reading processing is called document skim through.

When the document passes above the platen glass 102, a lamp 103 of a scanner unit 104 illuminates the document, and reflection light from the document is introduced into an image sensor 109 through mirrors 105, 106 and 107 and a lens 108.

The document conveyed by the document supply portion 100 can be once stopped on the platen glass 102, and the scanner unit 104 can be moved from left to right in this state and reading processing of the document can be carried out. This reading processing is called document fixing reading. When a document is read without using the document supply portion 100, a user lifts up the document supply portion 100 and sets it on the platen glass 102. In this case, the document fixing reading is carried out.

The image data of the document read by the image sensor 109 is subjected to predetermined image processing and is sent to an exposure controlling portion 110. The exposure controlling portion 110 outputs laser light corresponding to an image signal. The laser light is scanned by a polygon mirror 110*a* and in this state, the laser light illuminates a photoconductive drum 111. An electrostatic latent image corresponding to the scanned laser light is formed on the photoconductive drum 111.

The electrostatic latent image formed on the photoconductive drum 111 is developed by a development device 113 constituting an image forming portion together with the photoconductive drum 111, and is visualized as a toner image. A recording sheet P is conveyed to a transfer portion 116 from any of cassettes 114 and 115, a manual feeder 125 and a sheet re-feeding path 124. The visualized toner image is transferred on the recording sheet in the transfer portion 116. The recording sheet on which the toner image has been transferred is subjected to fixing processing in a fixing portion 177.

The recording sheet which passed through the fixing portion 177 is once introduced to a path 122 by a switching member 121, and after a rear end of the recording sheet passes through the switching member 121, it is switched back, and is conveyed to a discharge roller 118 by the switching member 121. The recording sheet is discharged from the printer portion 300 by the discharge roller 118. With this, the recording sheet is discharged from the printer portion 300 in a state where a surface thereof on which the toner image is formed is directed downward (face down). This is called invert discharge.

When images are formed from a top page in rotation by discharging the face down recording sheets from the apparatus, e.g., when images are formed using the document supply portion 100, or when images with respect to image data from a computer are formed, page orders can be arranged.

When images are formed on both surfaces of a sheet, the sheet is introduced from the fixing portion 177 straightly toward the discharge roller 118, and the sheet is switched back immediately after a rear end of the sheet passes through the switching member 121, and the sheet is introduced into the sheet re-feeding path by the switching member 121.

(Folding Processing Portion and Finisher)

Next, structures of the folding processing portion 400 and the finisher 500 will be described with reference to FIGS. 1 and 2.

The folding processing portion 400 includes a convey path 131 for introducing a sheet discharged from the printer portion 300 toward the finisher 500. Pairs of conveying rollers 130 and 133 are provided on the convey path 131. A switching member 135 is provided near the pair of conveying rollers 133. The switching member 135 introduces a sheet conveyed by the pair of conveying rollers 130 toward a folded path 136 or the finisher 500.

When a sheet is subjected to folding processing, the switching member 135 is switched toward the folded path 136 to introduce a sheet to the folded path 136. The sheet introduced by the folded path 136 is conveyed to a folding roller 140 and folded into Z-shape. When a sheet is not folded, the switching member 135 is switched toward the finisher 500, and the sheet discharged from the printer portion 300 is directly sent through the convey path 131.

A tip end of the sheet conveyed through the folded path 136 abuts against a stopper 137 and a loop is formed, and the loop is folded by folding rollers 140 and 141. This bent portion abuts against an upper stopper 143 and a loop is formed, and the loop is further bent by folding rollers 141 and 142 and the sheet is folded into Z-shape. The Z-folded sheet is sent to the convey path 131 through a convey path 145, and the sheet is discharged into the finisher 500 provided downstream in the sheet conveying direction (simply, downstream, hereinafter). The folding processing by the folding processing portion 400 is selectively carried out.

The finisher 500 takes a sheet from the printer portion 300 conveyed through the folding processing portion 400, and carries out the following processing selectively. That is, processing of sheet such as processing for aligning a plurality of taken sheets with each other, and tying the sheets as one sheet bundle, processing (binding processing) for stapling rear ends of the sheet bundle, sorting processing, in-sort processing are carried out.

As illustrated in FIG. 2, the finisher 500 includes a convey path 520 which takes a sheet conveyed through the folding processing portion 400 into the apparatus. The convey path 520 is provided with a plurality of pairs of conveying rollers.

A punch unit 530 is provided in an intermediate portion of the convey path 520, the punch unit 530 is operated when necessary, and the punch unit 530 forms a hole in a rear end of a conveyed sheet.

The convey path 520 is provided at its terminal end with a switching member 513. The switching member 513 switches paths to an upper discharge path 521 and a lower discharge path 522 connected to downstream portions of the switching member 513. The upper discharge path 521 discharges sheet to an upper stack tray. The lower discharge path 522 discharges sheet to a processing tray 550. Sheets discharged into the processing tray 550 are aligned with each other and accommodated in a form of a bunch, and are discharged into stack trays 700 and 701 by a pair of bundle discharge rollers 551.

The stapling processing is carried out a stapler 560. The stapler 560 can move in a width direction intersecting with a convey direction of a sheet. The stapler 560 can staple at any position of a sheet.

(Saddle Stitch Binding Portion)

Next, a structure of a saddle stitch binding portion 800 will be explained. A sheet is switched to the right by a switching member 514 provided in an intermediate portion of a lower discharge path 522. The sheet passes through a saddle discharge path 523 and is sent to the saddle stitch binding portion 800. The sheet is received by a pair of saddle inlet rollers 801, one of inlets is selected by a switching member 802 which is operated by solenoid in accordance with size thereof, and the sheet is conveyed into an accommodating guide 803 of the saddle stitch binding portion 800. The conveyed sheet is conveyed until a tip end of the sheet comes into contact with a movable sheet positioning member 805 by a slide roller 804. The pair of saddle inlet rollers 801 and the slide roller 804 are driven by a motor M1. A stapler 820 is provided at an intermediate position of the accommodating guide 803 such as to be opposed with the accommodating guide 803 interposed therebetween. The stapler 820 is divided into a driver 820*a* which projects staples S (see FIG. 3) and an anvil 820*b* which bents the projecting staple S. When a sheet is conveyed, the sheet positioning member 805 stops at a position where a central portion of the sheet positioning member 805 in a conveying direction of a sheet comes to a binding position of the stapler 820. The sheet positioning member 805 is driven by a motor M2 and can move, and changes its position in accordance with a size of a sheet.

A pair of folding rollers 810*a* and 810*b* are provided downstream from the stapler 820, and a push-out member 830 is provided at a position where the pair of folding rollers 810*a* and 810*b* are opposed to each other. The push-out member 830 has a home position at a location retreated from the accommodating guide 803, the push-out member 830 is driven by a motor M3 and the push-out member 830 protrudes toward the accommodated sheet bundle, thereby folding the sheet bundle while pressing the sheet bundle against nips of the pair of folding rollers 810*a* and 810*b*. The push-out member 830 is again returned to the home position thereafter. A pressure F1 which is sufficient to put a crease in the bundle is applied between the pair of folding rollers 810 by a spring (not illustrated). The bundle in which the crease is put is discharged into the trimmer unit 60 as a sheet cutting apparatus through a pair of first folding conveying rollers 811*a* and 811*b* and a pair of second folding conveying rollers 812*a* and 812*b*. Pressures F2 and F3 which are sufficient to convey and stop a bundle having a crease are also applied the pair of first folding conveying rollers 811*a* and 811*b* and the pair of second folding conveying rollers 812*a* and 812*b*.

The pair of folding rollers 810*a* and 810*b*, the pair of first folding conveying rollers 811*a* and 811*b* and the pair of second folding conveying rollers 812*a* and 812*b* are rotated at equal speed by the same motor M4.

To fold a sheet bundle bound by the stapler 820, the sheet positioning member 805 is lowered from a place at the time of staple processing by a predetermined distance such that the stable position of the sheet bundle comes to a nip position of the pair of folding rollers 810 after the staple processing is completed. With this, a sheet bundle can be folded around the position where the staple processing is carried out.

A pair of aligning plates 815 align sheets accommodated in the accommodating guide 803. The aligning plates 815 have surfaces protruding toward the accommodating guide 803 while extending around outer peripheral surfaces of the pair of folding rollers 810*a* and 810*b*. The pair of aligning plates 815 are driven by a motor M5 and moved in a sandwiching direction, thereby positioning a sheet in its width direction.

Figure 3:
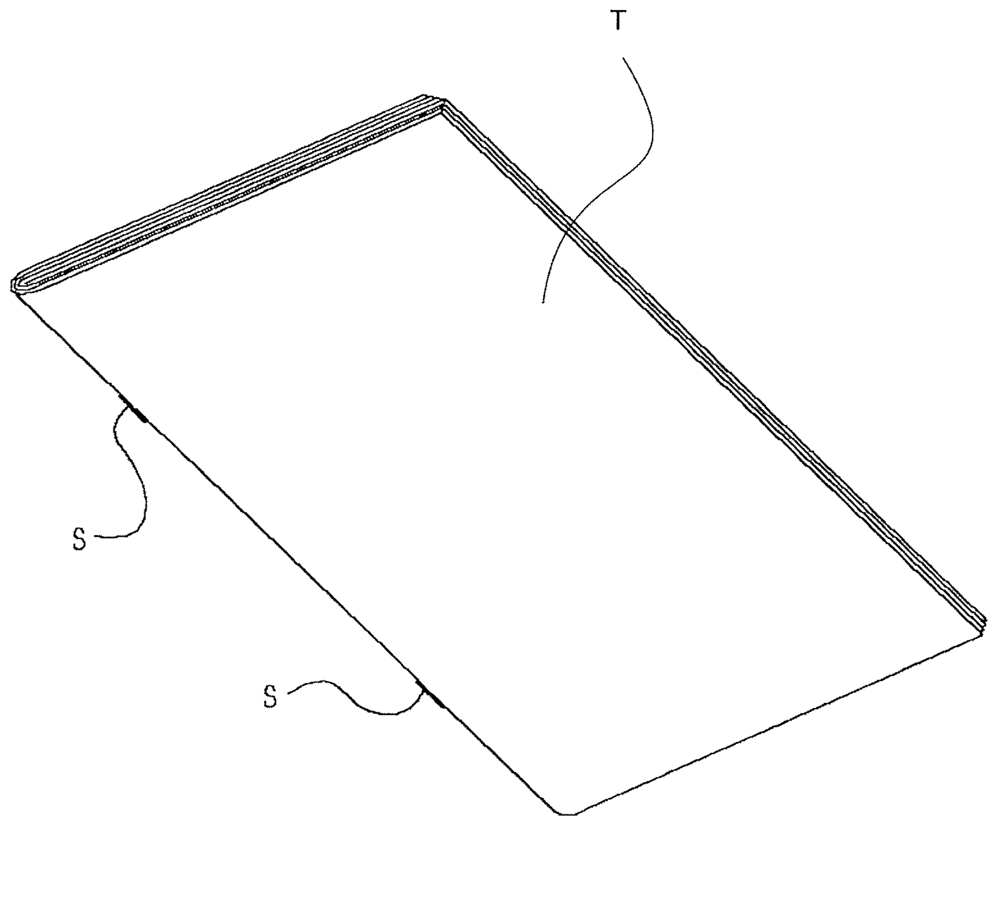
FIG. 3 is a perspective view illustrating a sheet bundle before it is cut.

A crease press unit 860 is provided downstream of the pair of second folding conveying rollers 812*a* and 812*b*. The crease press unit 860 moves in a direction intersecting with a conveying direction of the sheet bundle, thereby nipping and moving a crease of the sheet bundle by a pair of pair of press rollers 861, to strengthen the crease. In this manner, a book-shaped sheet bundle T illustrated in FIG. 3 is formed.

(Trimmer Unit)

Next, the trimmer unit 600 as a sheet cutting apparatus will be described using FIG. 2. In the trimmer unit 600, a first conveying portion 610, a second conveying portion 620, a trim portion 630, a third conveying portion 640, a fourth conveying portion 650 and a discharge portion 660 are disposed in this order from upstream side in the conveying direction of a sheet bundle (simply, upstream, hereinafter).

The first conveying portion 610 includes a lower convey belt 611 only on the lower side for receiving a sheet bundle from the saddle stitch binding portion 800. Side guides 612 are disposed on both sides of the lower convey belt. By moving the side guides 612 in the width direction of a sheet bundle, skew feeding of sheets can be corrected. A press guide 614 which prevents a sheet bundle from opening is disposed on the side guides 612 so that sheet bundle can be delivered to and from the second conveying portion 620 smoothly.

A first conveying portion inlet sensor 615 and a first conveying portion outlet sensor 616 are disposed upstream and downstream of the press guide 614 for detecting whether there is a sheet bundle. Conveying pawls 613 are disposed on both sides of the lower convey belt 611. The conveying pawls 613 can move in the conveying direction of a sheet bundle, and moves at the same speed as that of the conveying belt 611 for receiving and delivering a sheet from and to the second conveying portion. When slip is generated between the conveying belt 611 and a sheet bundle, the conveying pawl 613 comes into contact with a rear end of the sheet bundle, and the conveying pawl 613 conveys while pushing the rear end of the sheet bundle so that the sheet bundle can be conveyed.

Next, the second, third and fourth conveying portions include pairs of conveying belts 621, 622; 645 and 646; and 655 and 656. Upper and lower conveying belts of each conveying portion are driven by the same motor, and conveying speeds of the conveying portions are the same.

A second conveying portion inlet sensor 623 is disposed downstream of a sandwiching portion J of the second conveying portion 620 so that the second conveying portion inlet sensor 623 detects that a sheet bundle is delivered to a second conveying portion. The third conveying portion 640 includes a stopper 641 which can project and retreat, and move in the conveying direction. The stopper 641 is driven by a motor such as to turn around a K-portion through cams 642 and 648, and the stopper 641 can project and retreat. The stopper 641 is mounted on a slide block 643, the stopper 641 is driven by a motor (not illustrated) along a slide guide 644, and moves in accordance with a size of a sheet bundle in the conveying direction and a stopping position of the sheet bundle. The fourth conveying portion 650 conveys a sheet bundle upward.

Figure 4:
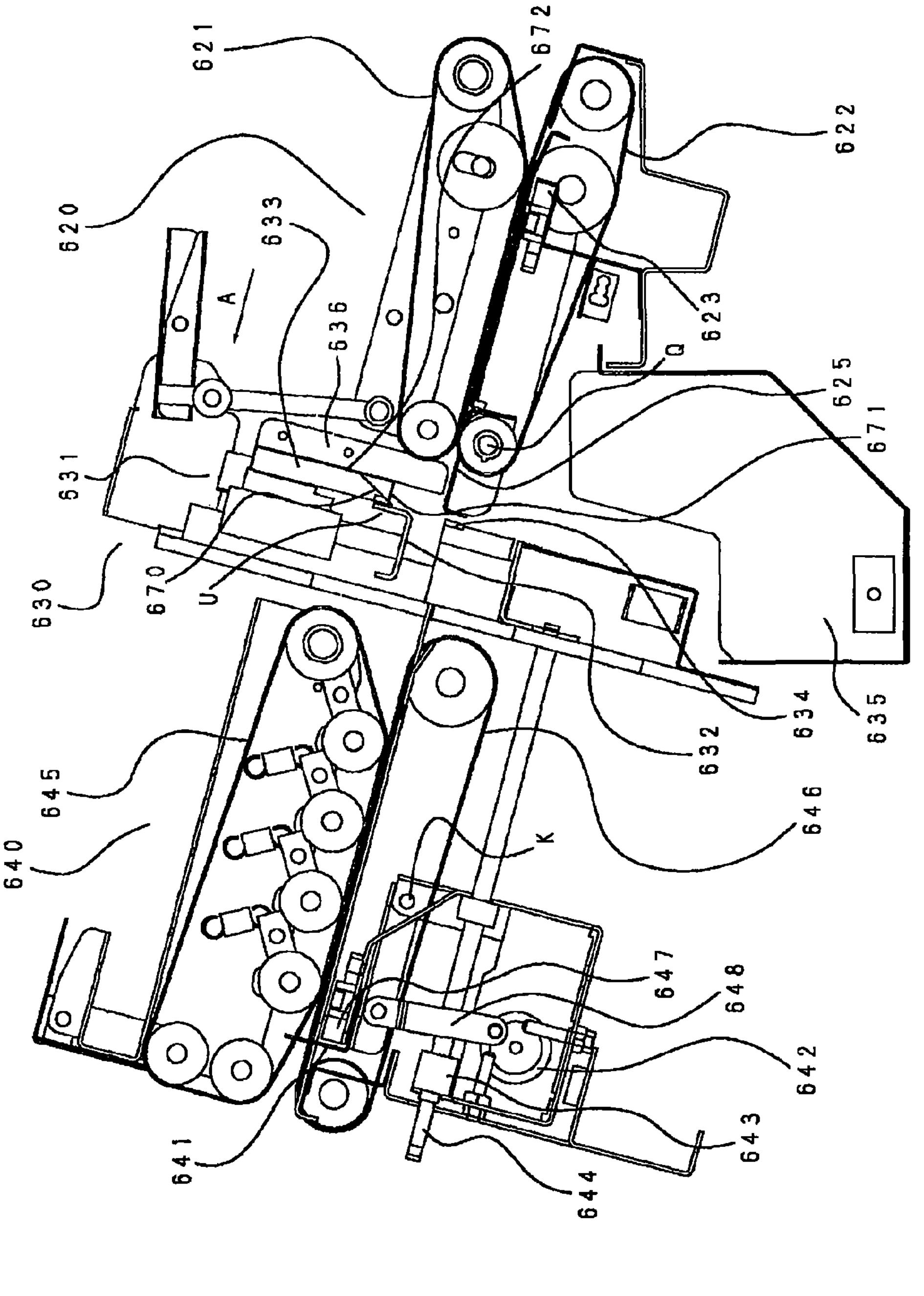
FIG. 4 is a sectional view illustrating peripheries of a trim portion of a trimmer unit.
Figure 5:
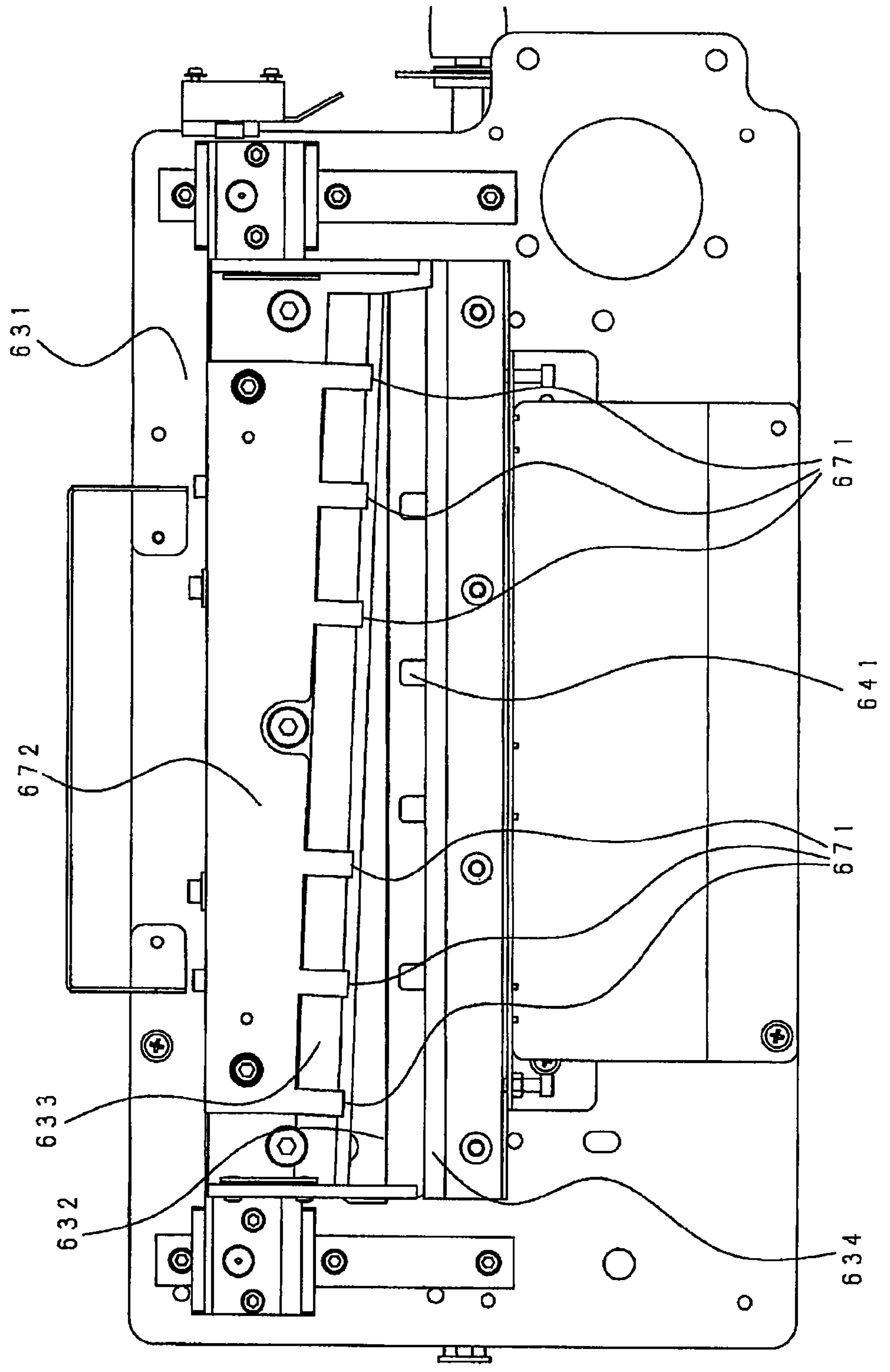
FIG. 5 is a diagram of the peripheries of the trim portion illustrated in FIG. 4 as viewed from an upstream side.
Figure 6:
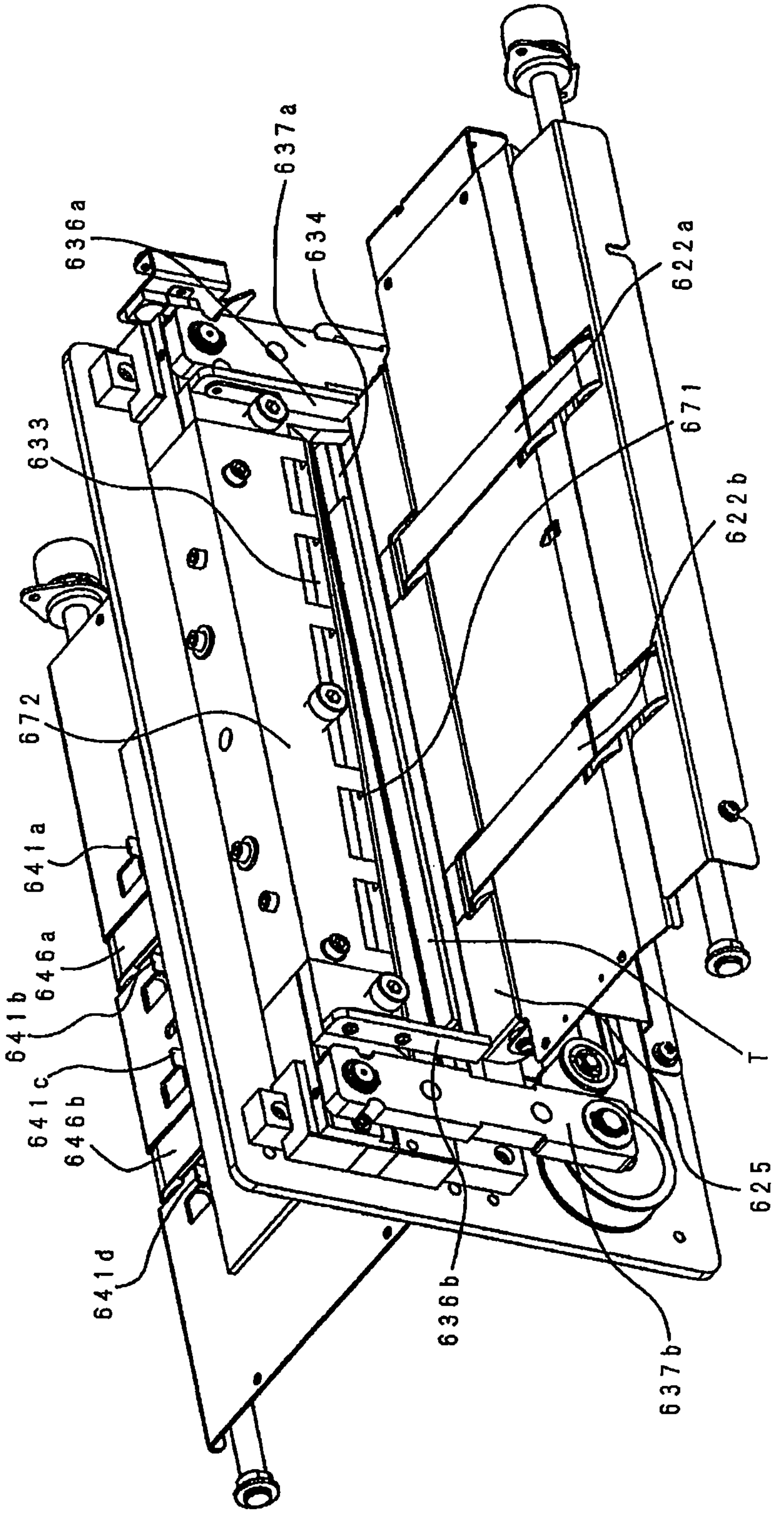
FIG. 6 is a perspective view illustrating the peripheries of the trim portion of the trimmer unit.

A cutter unit 631 is disposed in the trim portion 630 in a direction intersecting with a convey path. FIG. 4 is an enlarged view of the trim portion. FIG. 6 is a pushing surface of peripheries of the trim portion. Only parts near the third conveying portion are illustrated for description, and an upper conveying belt and the like are omitted. FIG. 5 is a diagram as viewed from the direction of the arrow A in FIG. 5, and a cutting blade portion is illustrated.

The cutter unit 631 is driven by a motor (not illustrated), and is vertically moved in a direction perpendicular to a conveying surface by links 637 (links 637*a* and 637*b* illustrated in FIG. 6). The press member 632 and an upper blade (movable blade) 633 are disposed in the cutter unit 631, and when the cutter unit 631 is moved downward, the press member 632 first abuts against a sheet bundle. Since the press member 632 is biased downward by a spring (not illustrated), the cutter unit 631 is further moved downward while sandwiching the sheet bundle, and the sheet bundle can be cut by the upper blade 633 and a lower blade (fixed blade) 634 fixed downstream of the upper blade 633 in the moving direction. At that time, a shutter 625 disposed downstream of the second conveying portion is pushed by a cam 636 which is mounted on the cutter unit 631 and provided outside of the convey path, and the shutter 625 is opened and closed around the fulcrum Q when the cutter unit 631 is moved downward. An accommodating box 635 is disposed below the cutter unit 631 (location of extension of the upper blade 633 in the moving direction), and cut pieces of sheets cut by the cutter unit 631 are accommodated in the accommodating box 635. When the shutter 625 is not pushed by the cam 636, the shutter 625 is biased by a torsion coil spring (not illustrated), the shutter 625 functions as a conveying guide connecting the conveying belt 622 and the lower blade 634 with each other, and closes a passing path of the cut piece to the accommodating box 635. A discharge portion 660 is disposed most downstream, and stacks a sheet bundle conveyed by the fourth conveying portion 650.

Figure 7:
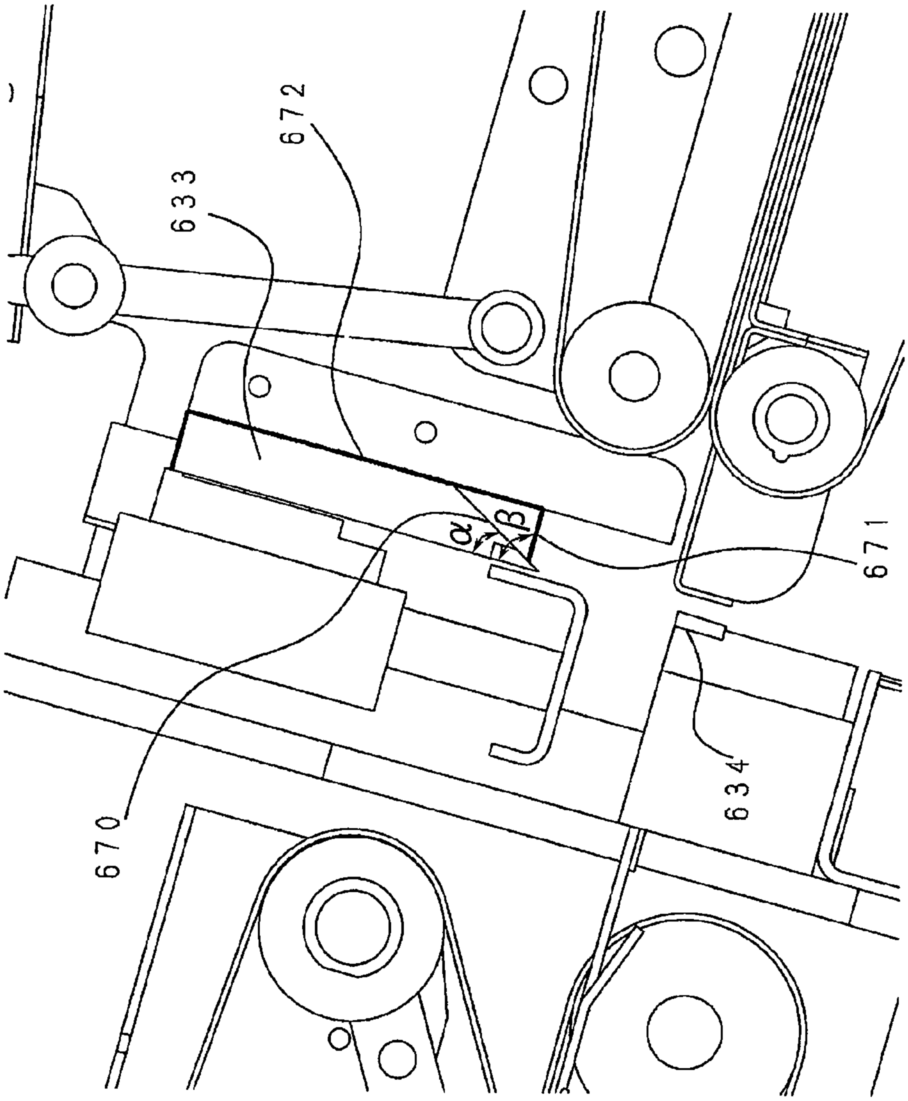
FIG. 7 is a sectional view of an essential portion of peripheries of an upper blade of the trimmer unit.

FIG. 7 is an enlarged view of peripheries of the upper blade 633. As illustrated in FIG. 7 also, the upper blade 633 is a movable blade, and has a tapered surface 670 forming an acute cutting edge for cutting a sheet (sheet bundle, here). A pushing member 672 is fixed to the upper blade 633. The pushing member 672 moves downward together with the upper blade 633 and pushes a cut piece of a sheet bundle cut by the upper blade 633 in a direction separating away from the upper blade 633. The pushing member 672 is provided with a pushing surface 671 in which a tapered surface 670 forming the cutting edge of the upper blade 633 forms an angle $\beta$ which is greater than an angle $\alpha$ formed with respect to the moving direction of the upper blade 633. The pushing surface 671 is located upstream from the tip end of the upper blade 633 in the moving direction, an end of the pushing surface 671 is integrally provided on a tapered surface 670 of the upper blade 633, and the end of the pushing surface 671 is in intimate contact with the tapered surface 670. The cutting edge of the upper blade 633 and the pushing surface 671 are disposed substantially in parallel to each other in the longitudinal direction (see FIG. 5) and the pushing surface 671 retracted from the tip end of the upper blade 633 at a predetermined distance. The pushing surface 671 forms a surface intersecting with the moving direction of the cutter unit 631 substantially at right angles, the pushing surface 671 moves downward together with the upper blade 633 in association with the cutting motion, and pushes down a cut piece of a cut sheet. The pushing down effect that the pushing surface 671 pushes down a cut piece becomes higher as the pushing surface 671 is closer to the tip end of the upper blade 633. Therefore, the pushing surface 671 is disposed as close as possible to the upper blade 633 in such a degree that the cutting operation is not hindered.

The cutting edge of the upper blade 633 is straight edge extending from a deep side to a front side of the apparatus as illustrated in FIG. 5, and the lower blade 634 has a shape which is horizontal with respect to the convey path. Therefore, if the upper blade 633 is moved downward, it comes into point contact with the sheet bundle on the lower blade 634, and continuously cuts the sheet bundle from the deep side to the front side. The lower blade 634 is a fixed blade which cuts the sheet bundle with the upper blade 633, and the upper blade 633 is the movable blade which moves downward such that its pushing surface 671 moves beyond the tip end of the lower blade 634.

As illustrated in FIGS. 5 and 6, the plurality of the pushing surfaces 671 are provided along the tip end of the upper blade 633 at distances from one another in the longitudinal direction intersecting with the moving direction of the upper blade 633. More specifically, the pushing surface 671 is divided into a plurality of (six, in this example) parts in a form of a comb in the longitudinal direction of the upper blade 633. The width of each pushing surface 671 (length in the longitudinal direction) is set to about 10 mm. With this, a contact area between the upper blade 633 and a cut piece of a sheet can extremely be reduced as compared with a case in which the pushing surface 671 is not divided, and cut pieces are less prone to adhere to each other by static.

The pushing member 672 having the pushing surface 671 is made of conductive material (e.g., stainless steel), and is electrically grounded. Not only the pushing member 672 but also the upper blade 633 and the lower blade 634 are electrically grounded through a frame. Therefore, cut pieces are less prone to adhere to each other due to static, and the cut pieces are not prevented from falling by static.

The pushing surface 671 corresponds to bundles of sheets T of various sizes conveyed to the trim portion 630, and the pushing surface 671 can reliably push down cut pieces of a sheet bundle of any size.

The pushing member 672 is elastic, and the tip end of the pushing surface 671 comes into intimate contact with the tapered surface 670 of the upper blade 633. With this, a gap between the pushing surface 671 and the upper blade 633 is reliably eliminated, and it is possible to prevent cut pieces of the sheets from entering therebetween during the cutting operation.

(Control System)

Figure 8:
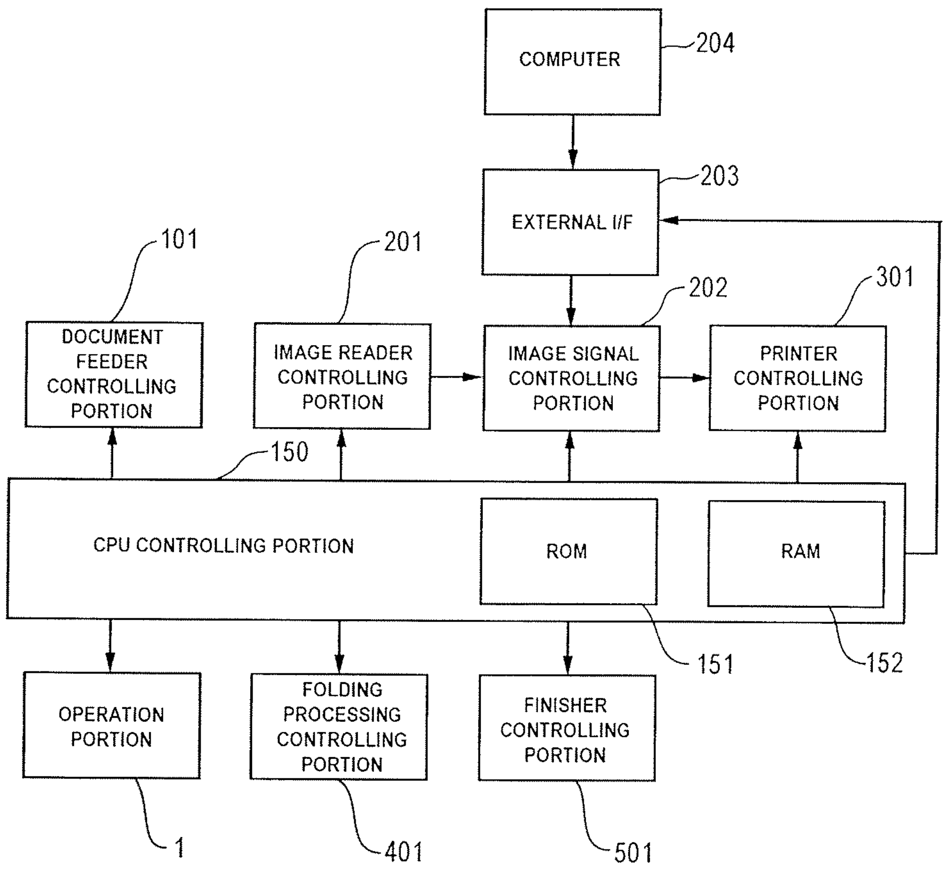
FIG. 8 is a block diagram of a control system of the image forming apparatus.

FIG. 8 is a block diagram of the copying machine 1000. A CPU controlling portion 150 has a CPU (not illustrated). In accordance with a control program stored in a ROM 151 and setting of an operating portion 1, the CPU controlling portion 150 controls a document feeder controlling portion 101, an image reader controlling portion 201, an image signal controlling portion 202, a printer controlling portion 301, a folding processing controlling portion 401, a finisher controlling portion 501 and an external I/F 203. The document feeder controlling portion 101 controls the document supply portion 100, the image reader controlling portion 201 controls the image reader portion 200, the printer controlling portion 301 controls the printer portion 300, and the folding processing controlling portion 401 controls the folding processing portion 400. The finisher controlling portion 501 controls the finisher 500, the trimmer unit 600, the saddle stitch binding portion 800 and the inserter 900.

The operating portion 1 includes a plurality of keys for setting various functions concerning image formation, and a display portion for displaying a setting state. The operating portion 1 outputs a key signal corresponding to a user's operation of each key to the CPU controlling portion 150, and displays corresponding information on the display based on a signal from the CPU controlling portion 150.

A RAM 152 is used as a region where control data is temporarily held and as an operating region for calculation caused by control. The external I/F 203 is an interface between the copying machine 1000 and an external computer 204, develops print data from the computer 204 into an bitmap image, and output the same to the image signal controlling portion 202 as image data. An image of a document which is read by an image sensor (not illustrated) is output from the image reader controlling portion 201 to the image signal controlling portion 202. The printer controlling portion 301 outputs the image data from the image signal controlling portion 202 to the exposure controlling portion (not illustrated).

(Cutting Operation of Sheet Bundle)

Flow of a sheet bundle in the trimmer unit 600 and motion of various parts will be described based on the above-described structure.

Figure 9:
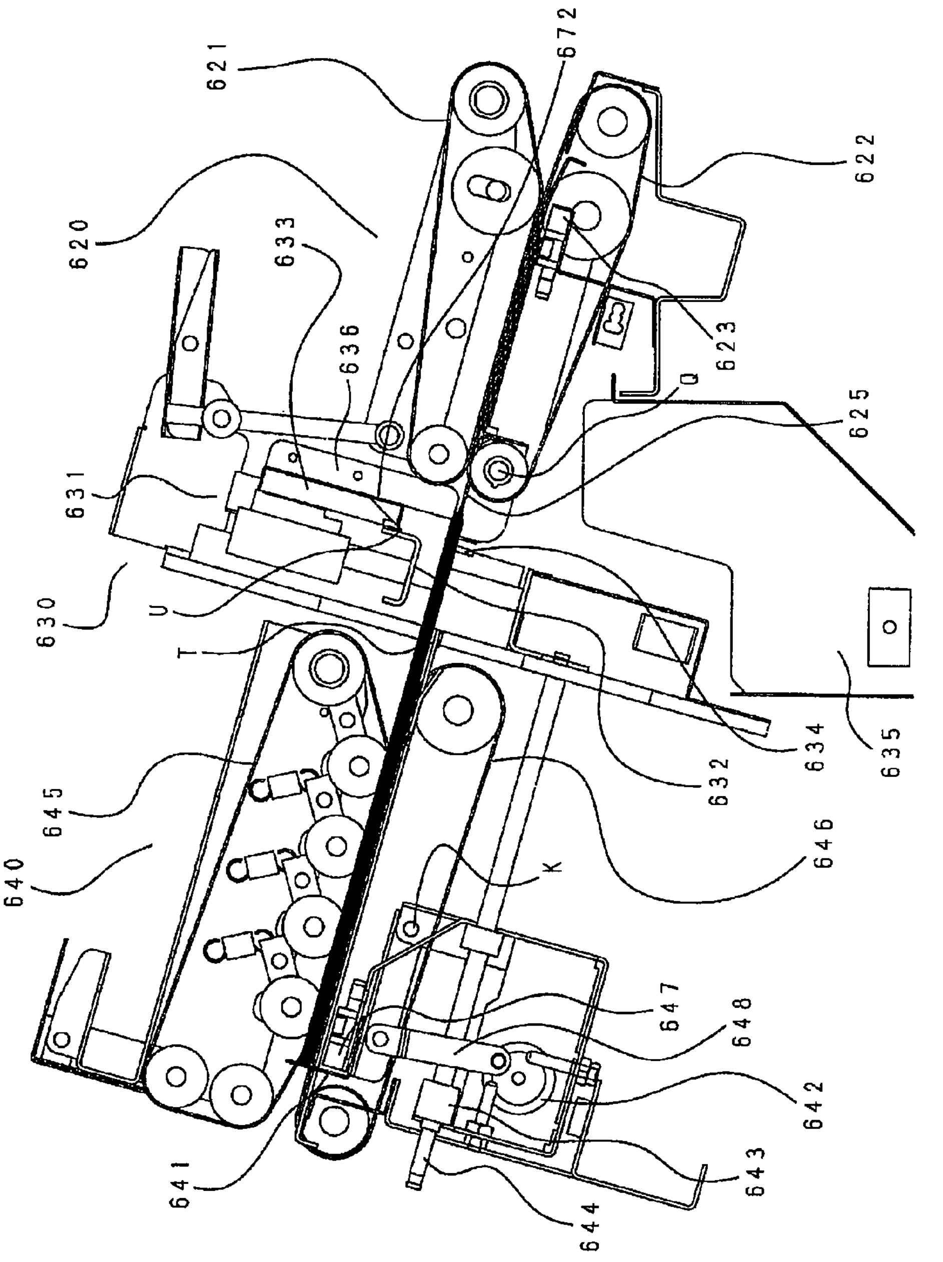
FIG. 9 is a sectional view illustrating peripheries of the trim portion of the trimmer unit.

The sheet bundle whose folding is reinforced by the press unit 860 is again conveyed, and delivered to the first conveying portion 610 of the trimmer unit 600. The lower convey belt 611 of the first conveying portion 610 rotates, the sheet bundle is conveyed, the sheet bundle is detected by the first conveying portion outlet sensor 616 and then, the conveying operation is once stopped. Then, the aligning operation is carried out by the side guides 612 disposed on both sides of the convey path and then, the conveying operation of the sheet bundle is restarted by the conveying pawl 613 disposed upstream of the first conveying portion and the lower convey belt 611. If the second conveying portion inlet sensor 623 disposed at the sandwiching portion J of the second conveying portion 620 detects the sheet bundle, the conveying pawl 613 is retreated upstream of the conveying direction. The sheet bundle passes through the trim portion 630 and is conveyed to the third conveying portion 640. In the third conveying portion 640, the stopper 641 previously protrudes to the convey path at an appropriate position suitably for a size of a sheet bundle to be conveyed, and the sheet bundle abuts against the stopper 641 and stops at a predetermined position (see FIGS. 6 and 9). Thereafter, the conveying belt of the third conveying portion 640 stops, the cutter unit 631 of the trim portion 630 starts downward moving, and the upper blade 633 cuts the rear ends of the sheet bundle.

Figure 10:
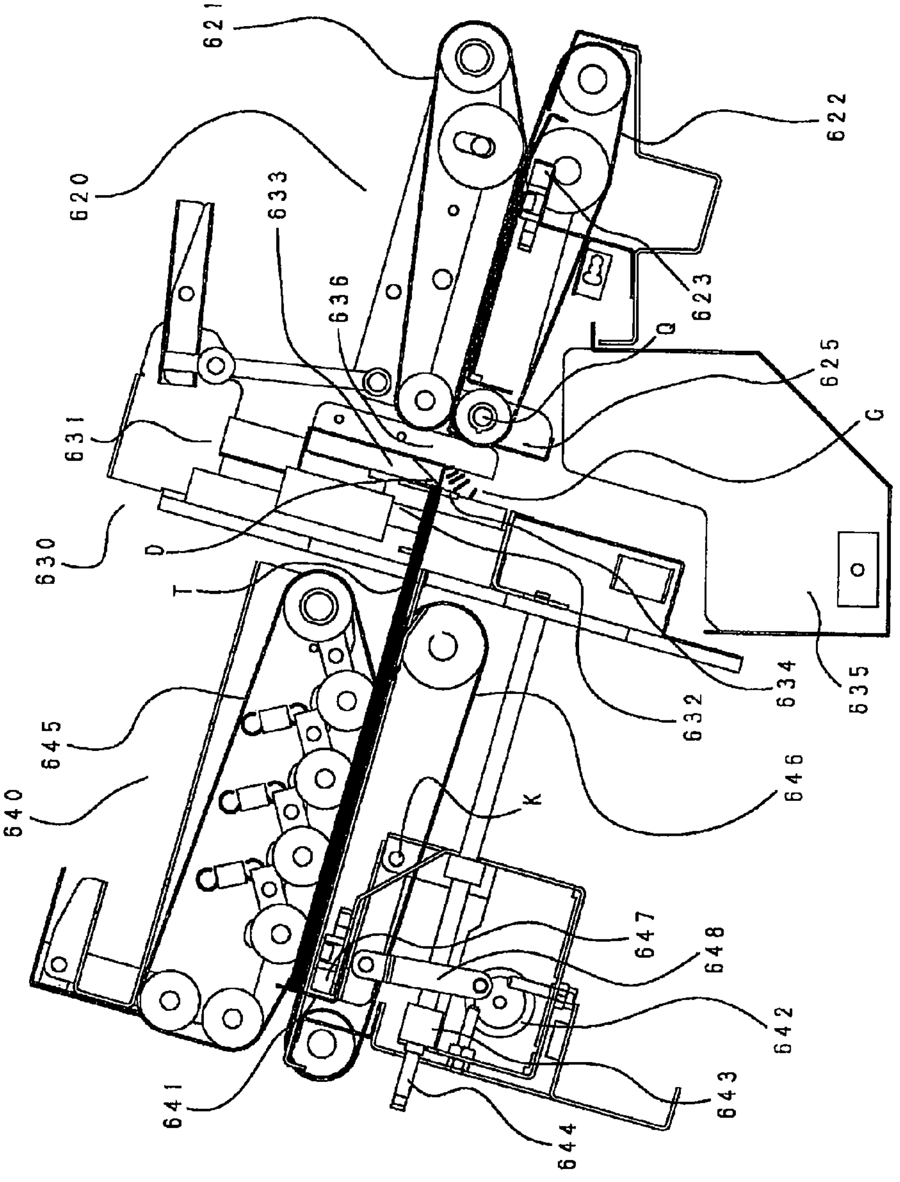
FIG. 10 is a sectional view illustrating the peripheries of the trim portion of the trimmer unit.
Figure 11:
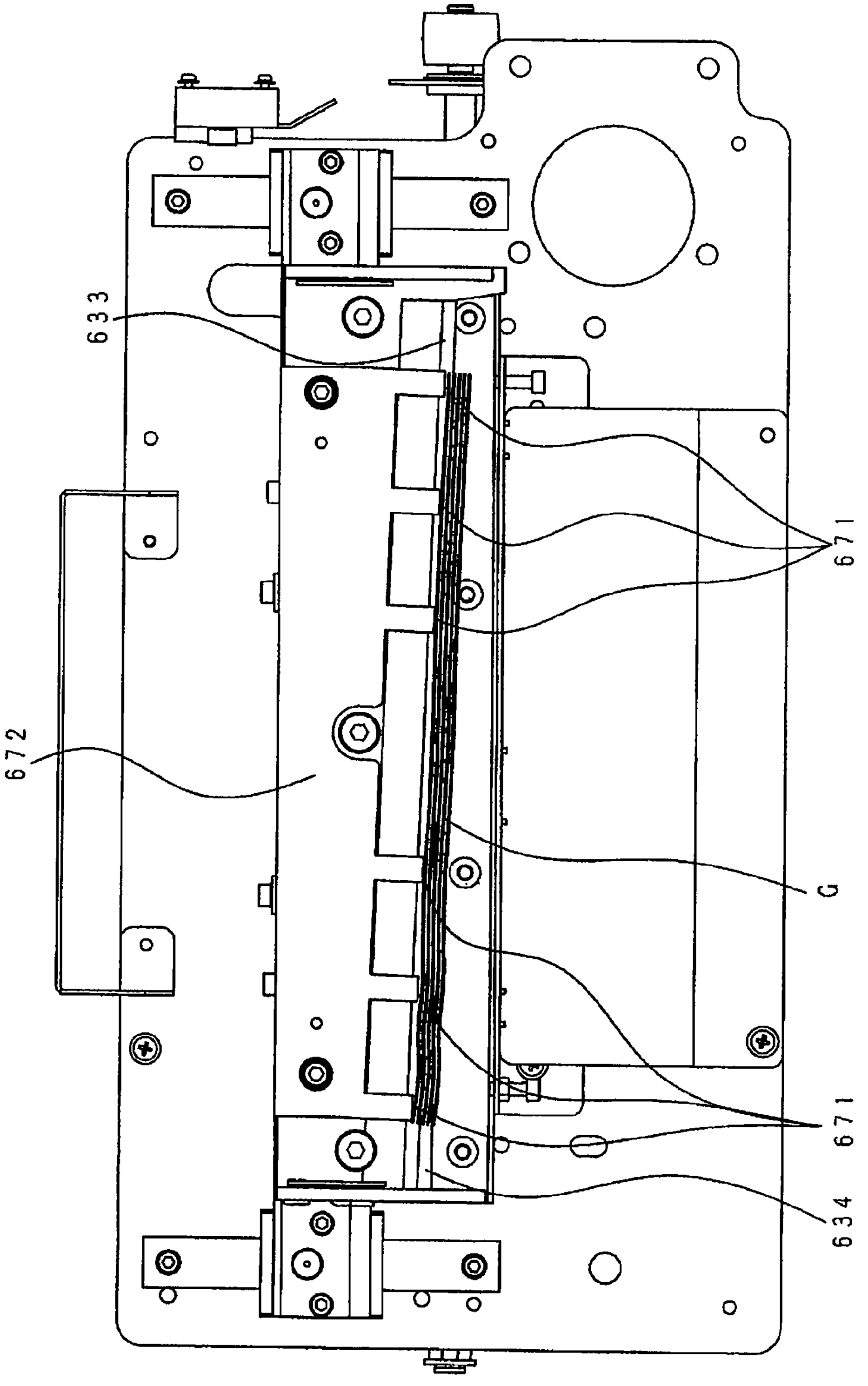
FIG. 11 is a diagram of the peripheries of the trim portion illustrated in FIG. 10 as viewed from an upstream side.

At that time, the upper blade 633 sequentially cuts the sheet bundle from its deep side in accordance with a shape of the cutting edge. The cut piece G is caught on the pushing surface 671 which moves downward together with the upper blade 633, and is forcibly pushed down by a force overcoming an external resistance (static electricity, air resistance and sliding resistance) (see FIGS. 10 and 11). The pushing surface 671 comes into contact with the cut piece G as described above, the contact area thereof is small and the pushing surface 671 is made of conductive material, the pushing surface 671 does not receive influence such as static and the cut piece G is not prevented from falling. In the bottom dead center D which is the lowest point of a movable region of the upper blade 633, the pushing surface 671 is located lower than the lower blade 634, the cut piece G is reliably separated from a blade surface by movement of the upper blade 633 to the bottom dead center D, and the cut piece G falls downward.

The shutter 625 is pushed by the cam 636 connected to the upper blade 633, and the shutter 625 opens a passing path of the cut piece from the cut portion to the accommodating box 635 before the sheet bundle is cut. After the cutter unit 631 once stops near the bottom dead center D which is the lowest point in the movable range of the links 637, the cutter unit 631 returns to the initial position (the top dead center U which is the uppermost point in the movable range of the links 637). The time during which the cutter unit 631 stops at the bottom dead center D is set within a binding time in the minimum number of sheet bundle formed by the saddle stitch binding portion 800. If the cutter unit 631 stops at the bottom dead center D, the passing path opening time of the cut piece of the shutter 625 is secured, and the falling cut piece G reliably falls into the accommodating box 635 as described above. As the cutter unit 631 returns to the initial position (top dead center U), the cam 636 separates from the shutter 625, and the shutter 625 closes the passing path of the cut piece by a torsion coil spring (not illustrated). Thereafter, the stopper 641 is retreated, and the conveying operation of the third conveying portion 640 is restarted. The sheet bundle is delivered to the fourth conveying portion 650 disposed downstream of the third conveying portion 640.

The sheet bundle conveyed upward by the fourth conveying portion 650 is discharged to the discharge portion 660, and sequentially stacked in a form of tiles. Since the discharge opening is formed at an upper portion by the fourth conveying portion 650, a user can easily take the sheet bundle out.

When a sheet bundle is conveyed continuously, the same operation is repeated, and a desired number of sheets are stacked on the discharge portion 660.

According to the embodiment, cut pieces G of sheets are forcibly pushed down by the pushing surface 671 of the pushing member 672 which moves downward together with the upper blade 633. Therefore, the cut pieces can reliably fall and can be accommodated in the accommodating box 635 without remaining in the convey path.

The pushing surface 671 of the pushing member 672 moves in association with the upper blade 633. Therefore, it is unnecessary to newly provide a driving mechanism, and the apparatus can be realized with a simple structure.

Since a cut piece G of a sheet can reliably fall without remaining on the convey path. Therefore, a cut piece is not accommodated together with a sheet, dignity is not degraded, malfunction of a sensor in the convey path can be prevented, and it is possible to realize reliable motion.

Another Embodiment

In the previous embodiment, in order to prevent a cut piece from adhering, and enhance the falling performance, the contact area with respect to the cut piece is reduced, and the pushing member 672 having pushing surface 671 which is divided in a form of a comb is mounted on the upper blade 633. However, the present invention is not limited to this structure.

Figure 12:
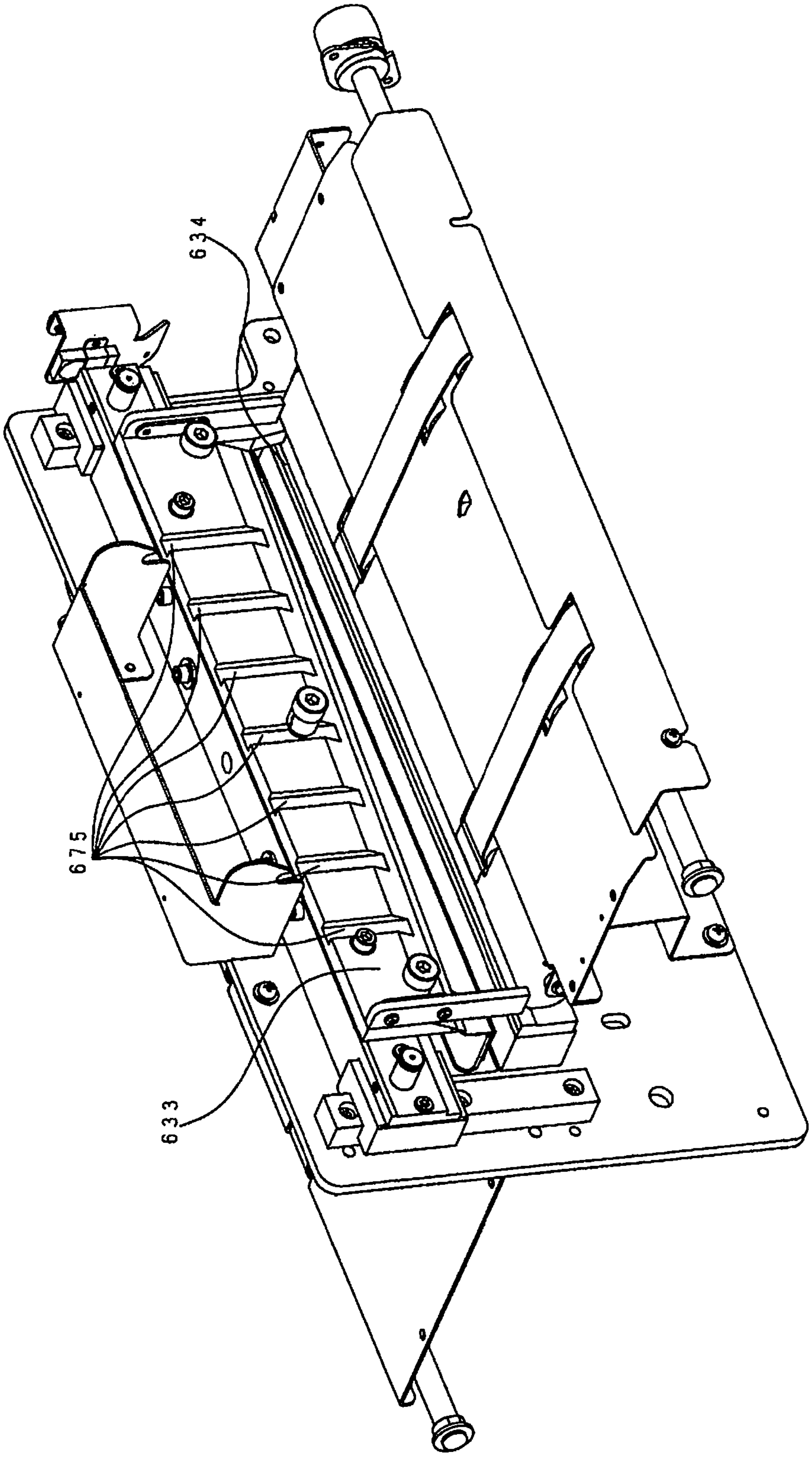
FIG. 12 is a perspective view illustrating another embodiment of the upper blade in the trimmer unit.
Figure 13:
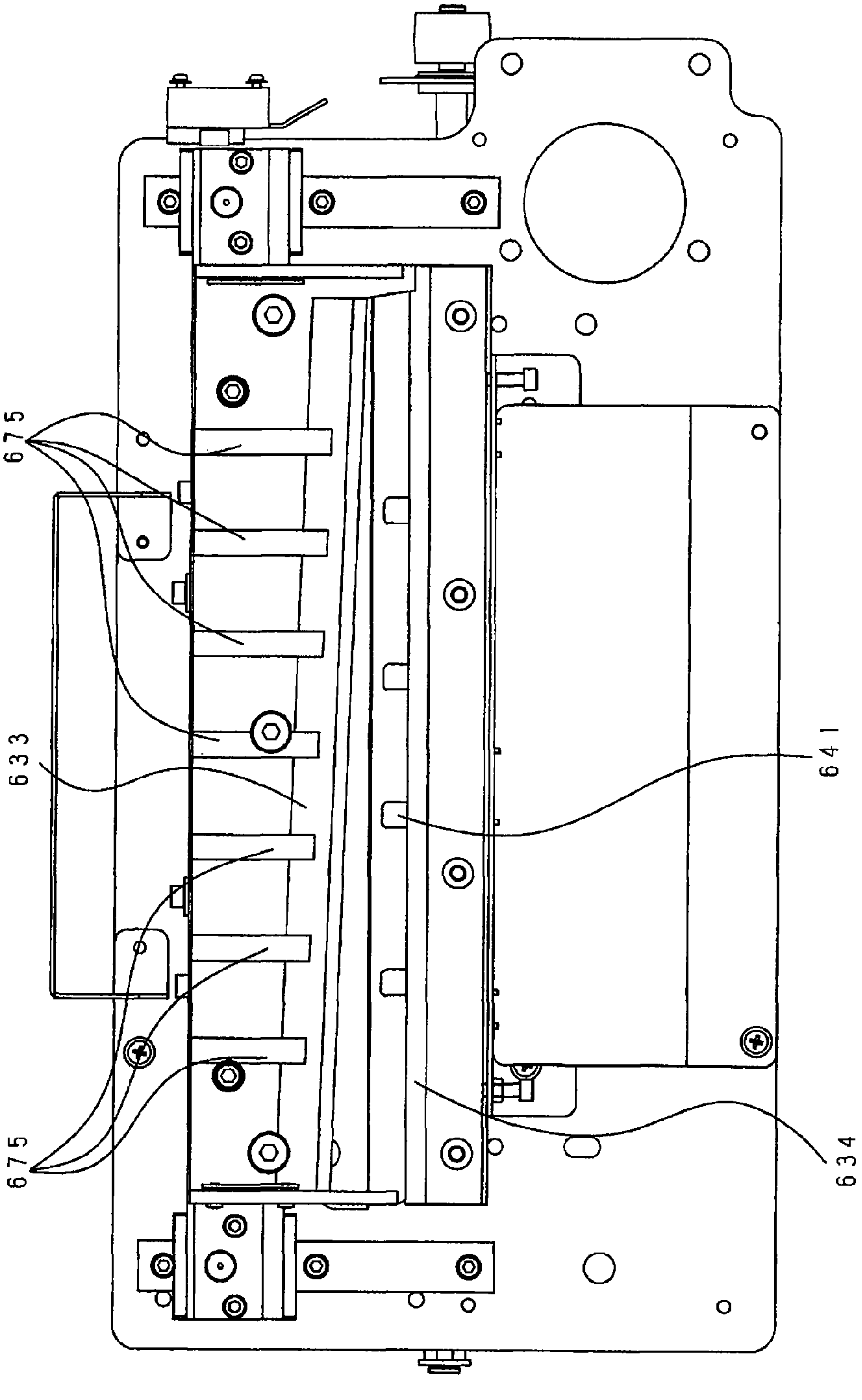
FIG. 13 is a diagram of the peripheries of the upper blade illustrated in FIG. 12 as viewed from an upstream side.

To obtain the same effect, a plurality of steps may be formed along a tip end of the upper blade 633 which is moved with respect to a sheet to cut the sheet, the plurality of steps are located on a position retracted from the tip end at a predetermined distance. More specifically, as illustrated in FIGS. 12 and 13, comb-like pits and projections (a plurality of grooves 675) may directly be provided on an upper portion of the upper blade 633 which is the movable blade except its tip end. Other structure is the same as that of the previous embodiment.

Since a cut piece G of a sheet after the cutting operation using this upper blade 633 comes into contact only with the projections of the upper blade 633, the cut piece does not adhere and falls.

The contact area of the upper blade which is the movable blade with respect to a cut piece may be reduced by providing holes instead of the grooves. If the contact area of a portion of the blade surface with respect to the cut piece is reduced instead of the pushing surface of the pushing member, adsorption of a cut piece by static can be prevented.

Figure 14:
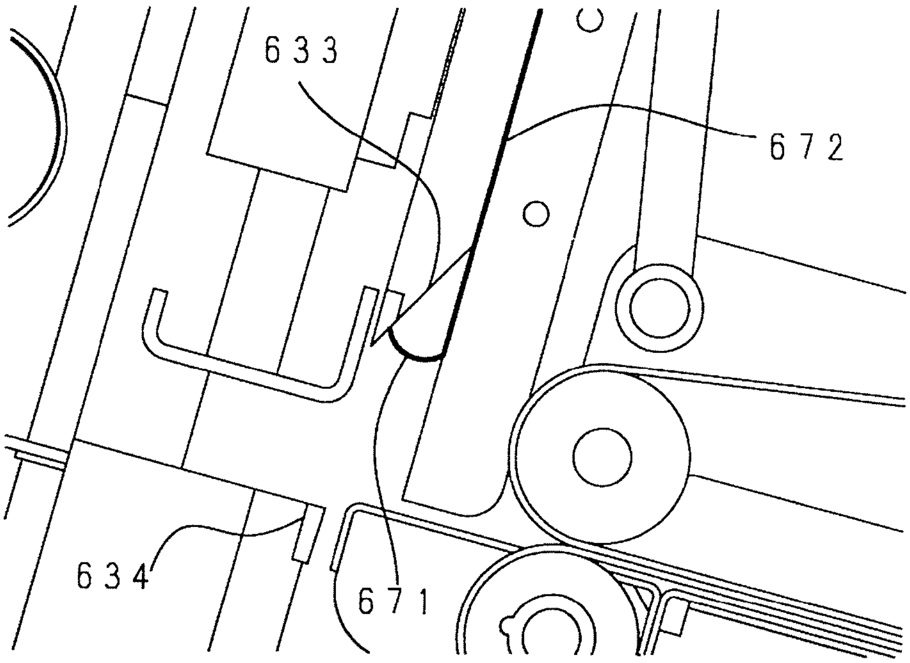
FIG. 14 is a sectional view of an essential portion illustrating another shape of a pushing surface of a pushing member.
Figure 15A:
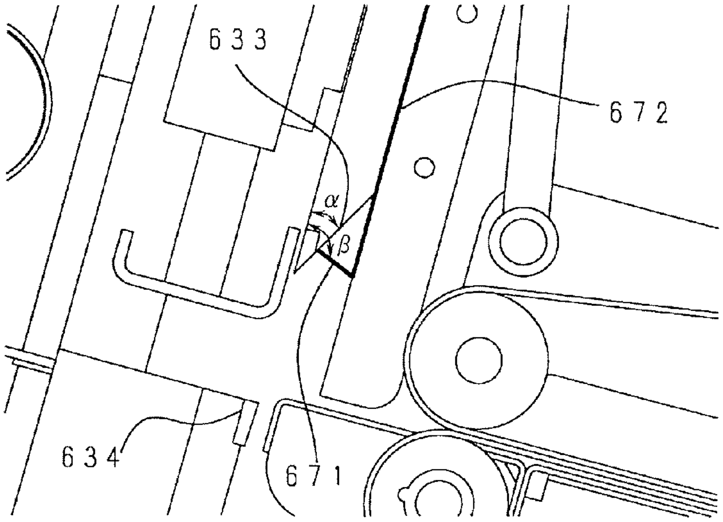
FIG. 15 is a sectional view of an essential portion illustrating another shape of the pushing surface of the pushing member.
Figure 15B:
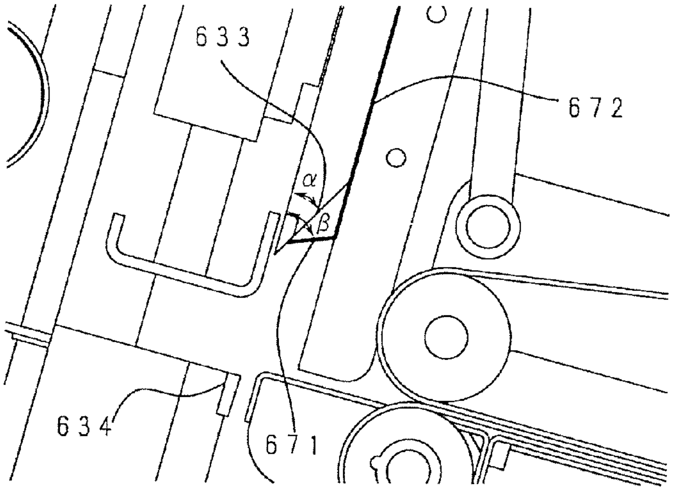

The pushing surface 671 of the embodiment has the surface which intersects with the moving direction of the cutter unit 631 substantially at right angles, but the invention is not limited to this structure. The pushing surface 671 may have another shape only if the pushing surface 671 forms the angle β greater than the angle α formed by the tapered surface 670 with respect to the moving direction of the upper blade 633. For example, as illustrated in FIG. 14, the pushing surface 671 may be formed into a round shape. Alternatively, the pushing surface 671 may be tapered having an angle β greater than 90° (see FIG. 15(*a*)) or having an angle β smaller than 90° (see FIG. 15(*b*)). In this case, since the cut piece G and the pushing surface 671 are not flush with each other, the transmitting efficiency of a push-down force, but the contact area therebetween is further reduced, and a cut piece is less prone to adhere.

Although the pushing member having the pushing surface is mounted on the movable blade in the embodiment, the invention is not limited to this structure. The pushing surface may directly be formed on the movable blade, or the pushing member and the movable blade may integrally formed as one member. With this structure, the number of parts can be reduced and the falling performance of a cut piece of a sheet can be enhanced.

Although the copying machine is indicated as the image forming apparatus in the embodiment, the invention is not limited thereto. The image forming apparatus may be a printer, a facsimile machine, and a multifunction machine. If the present invention is applied to a sheet cutting apparatus used for such an image forming apparatus, a similar effect can be obtained.

Although the sheet cutting apparatus can detachably be attached to the image forming apparatus in the embodiment, the invention is not limited to this. The sheet cutting apparatus may integrally be provided with the image forming apparatus, and if the invention is applied to such a sheet cutting apparatus, the same effect can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-046860, filed Feb. 27, 2007, No. 2008-028621, filed Feb. 8, 2008 which are hereby incorporated by reference herein in their entirety.

What is claimed is:

1. A sheet cutting apparatus comprising:

a stacking portion having a sheet stacking surface on which a sheet is stacked;

a movable blade which moves beyond the sheet stacking surface to cut the sheet, stacked on the sheet stacking surface, into a cut sheet and a cut piece; and a pushing member which moves together with the movable blade, and has a plurality of pushing surfaces which are arranged along a tip of the movable blade and are retracted from the tip of the movable blade at a predetermined distance to push down the cut piece beyond the sheet stacking surface, wherein the movable blade includes a tapered surface which forms a cutting edge to cut the sheet, and makes an acute angle with respect to a moving direction of the movable blade, and wherein the pushing member is in contact with the tapered surface of the movable blade, and an angle, facing the cut piece to be pushed, between each of the plurality of pushing surfaces and the tapered surface is an obtuse angle.

2. The sheet cutting apparatus according to claim 1, wherein the plurality of pushing surfaces are integrally formed on the tapered surface of the movable blade.

3. The sheet cutting apparatus according to claim 1, wherein the pushing member is made of conductive material and is electrically grounded.

4. The sheet cutting apparatus according to claim 1, wherein the pushing member and the movable blade are integrally formed as one piece.

5. The sheet cutting apparatus according to claim 1, further comprising a fixed blade which cuts a sheet with the movable blade, wherein the movable blade moves such that the plurality of pushing surfaces move beyond a cutting edge of the fixed blade.

6. The sheet cutting apparatus according to claim 1, further comprising an accommodating box in which a cut piece of the sheet is accommodated, wherein the accommodating box is located below the movable blade.

7. A sheet cutting apparatus comprising:

a movable blade which moves with respect to the sheet to cut the sheet; wherein a plurality of steps are arranged along a tip of the movable blade and retracted from the tip of the movable blade at a predetermined distance to push down the cut piece of the sheet cut by the movable blade.

8. An image forming apparatus comprising:

an image forming portion which forms an image on a sheet; and a sheet cutting apparatus which cuts the image-formed sheet; wherein the sheet cutting apparatus includes:

a stacking portion having a sheet stacking surface on which a sheet is stacked;

a movable blade which moves beyond the sheet stacking surface to cut the sheet, stacked on the stacking surface, into a cut sheet and a cut piece; and a pushing member which moves together with the movable blade, and has a plurality of pushing surfaces which are arranged along a tip of the movable blade and are retracted from the tip of the movable blade at a predetermined distance to push down the cut piece of the sheet cut by the movable blade, wherein the movable blade includes a tapered surface which forms a cutting edge to cut the sheet, and makes an acute angle with respect to a moving direction of the movable blade, and wherein the pushing member is in contact with the tapered surface of the movable blade, and an angle, facing the cut piece to be pushed, between each of the plurality of pushing surfaces and the tapered surface is an obtuse angle.

9. The image forming apparatus according to claim 8, wherein the plurality of pushing surfaces are integrally formed on the tapered surface of the movable blade.

10. The image forming apparatus according to claim 8, wherein the pushing member is made of conductive material and is electrically grounded.

11. The image forming apparatus according to claim 8, wherein the pushing member and the movable blade are integrally formed as one piece.

12. The image forming apparatus according to claim 8, further comprising a fixed blade which cuts a sheet with the movable blade, wherein the movable blade moves such that the plurality of pushing surfaces move beyond a cutting edge of the fixed blade.

13. The image forming apparatus according to claim 8, further comprising an accommodating box in which a cut piece of the sheet is accommodated, wherein the accommodating box is located below the movable blade.

* * * * *